United States Patent
Abad Garcia et al.

(10) Patent No.: US 12,477,201 B2
(45) Date of Patent: Nov. 18, 2025

(54) CAMERA MODULE HAVING A LENS ASSEMBLY WITH AT LEAST ONE FLANGE PROJECTING THEREFROM AND ASSEMBLING METHOD

(71) Applicant: Ficosa Adas, S.L.U., Barcelona (ES)

(72) Inventors: Daniel Abad Garcia, Barcelona (ES); Borja Felgueroso Rodrigo, Barcelona (ES)

(73) Assignee: Ficosa Adas, S.L.U., Barcelona (ES)

( * ) Notice: Subject to any disclaimer, the term of this patent is extended or adjusted under 35 U.S.C. 154(b) by 0 days.

(21) Appl. No.: 17/966,438

(22) Filed: Oct. 14, 2022

(65) Prior Publication Data

US 2023/0122739 A1  Apr. 20, 2023

(30) Foreign Application Priority Data

Oct. 15, 2021 (EP) ...................................... 21382934

(51) Int. Cl.
*H04N 23/55* (2023.01)
*B60R 11/00* (2006.01)
(Continued)

(52) U.S. Cl.
CPC ............. *H04N 23/55* (2023.01); *B60R 11/04* (2013.01); *G02B 7/021* (2013.01); *G02B 7/028* (2013.01);
(Continued)

(58) Field of Classification Search
CPC ........ H04N 23/55; H04N 23/00; H04N 23/54; H04N 23/57; H04N 23/52; B60R 11/04; B60R 2011/0077; G02B 7/021; G02B 7/028; G02B 27/0006; G03B 30/00; H05B 3/84; H05B 2203/016
See application file for complete search history.

(56) References Cited

U.S. PATENT DOCUMENTS 10,746,955 B2 *  8/2020  Park ..................... G02B 27/646
2014/0313337 A1  10/2014  Devota et al.
(Continued)

FOREIGN PATENT DOCUMENTS

CN  208156394 U  11/2018
EP  3226535 A   10/2017
(Continued)

OTHER PUBLICATIONS

European Search Report dated Mar. 14, 2022 for European Patent Application No. 21382934.4, 8 pages.

*Primary Examiner* — Padma Haliyur
(74) *Attorney, Agent, or Firm* — Brooks Kushman P.C.

(57) ABSTRACT

The camera module includes a housing having an interior space with an inner surface, a lens assembly comprising a lens body within the interior space defining an optical axis, an electronics carrier, an image sensor on the electronics carrier in optical communication with the lens assembly, at least one positioning element projecting longitudinally along the optical axis towards the electronics carrier for attaching the lens assembly and the electronics carrier to each other with a constant predetermined gap there between with the image sensor optically aligned with the lens assembly, and at least one flange projecting radially perpendicular to the optical axis that can be attached to the inner surface of the housing.

20 Claims, 3 Drawing Sheets

(51) Int. Cl.

|  |  |
|---|---|
| *B60R 11/04* | (2006.01) |
| *G02B 7/02* | (2021.01) |
| *G02B 27/00* | (2006.01) |
| *G03B 30/00* | (2021.01) |
| *H04N 23/00* | (2023.01) |
| *H05B 3/84* | (2006.01) |

(52) U.S. Cl.
CPC ......... *G02B 27/0006* (2013.01); *G03B 30/00* (2021.01); *H04N 23/00* (2023.01); *H05B 3/84* (2013.01); *B60R 2011/0077* (2013.01); *H05B 2203/016* (2013.01)

(56) References Cited

U.S. PATENT DOCUMENTS

| | | |
|---|---|---|
| 2017/0295306 A1 | 10/2017 | Mleczko |
| 2018/0017785 A1* | 1/2018 | Bulgajewski ............ H05B 3/58 |
| 2019/0094484 A1* | 3/2019 | Hasegawa .............. G02B 7/028 |
| 2019/0137723 A1* | 5/2019 | Bernal ................... H04N 23/55 |
| 2019/0278158 A1* | 9/2019 | Ishizuka ................ H04N 23/52 |
| 2019/0381952 A1 | 12/2019 | Wang |
| 2022/0244485 A1* | 8/2022 | Jeong ..................... G02B 7/102 |

FOREIGN PATENT DOCUMENTS

| | | | |
|---|---|---|---|
| JP | 2020194696 A | 12/2020 | |
| WO | 2016164173 A1 | 10/2016 | |
| WO | WO-2023036758 A1 * | 3/2023 | ............. B60R 11/04 |

\* cited by examiner

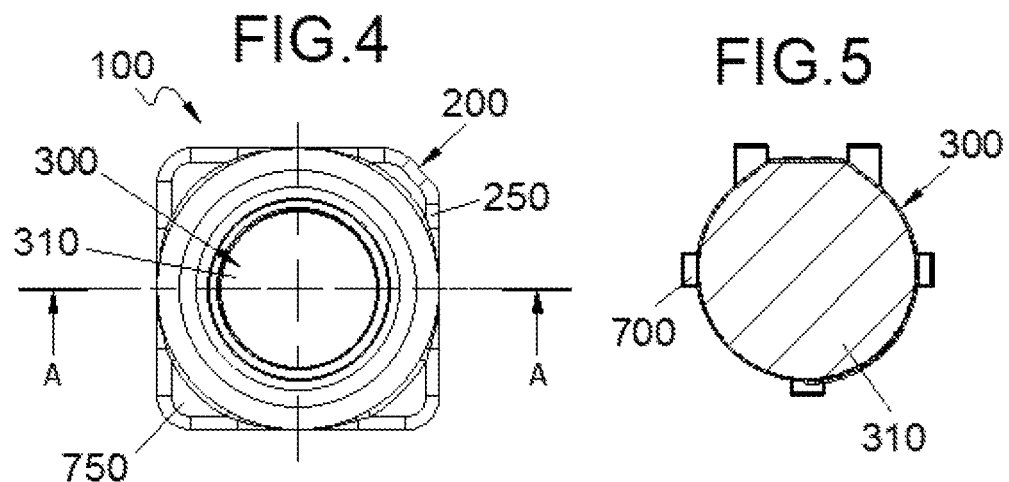
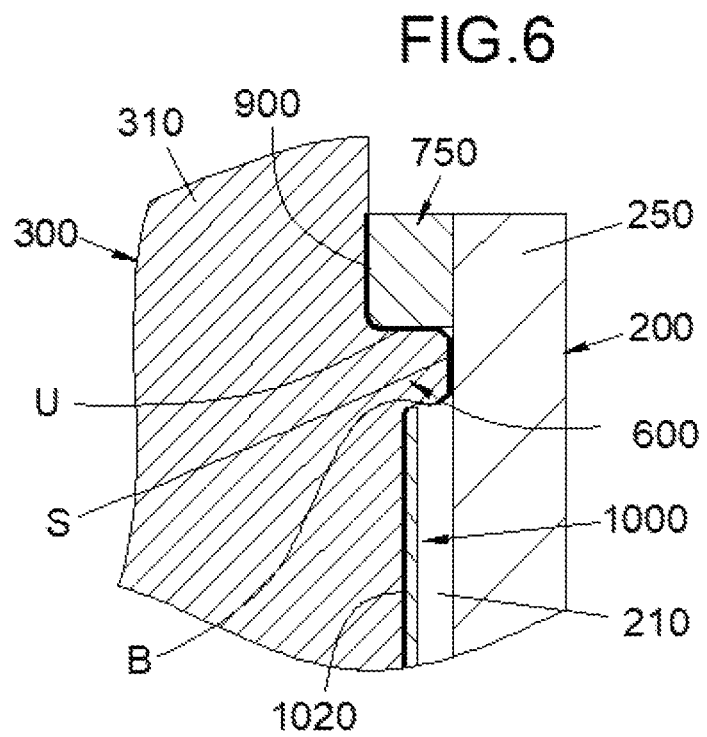

CAMERA MODULE HAVING A LENS ASSEMBLY WITH AT LEAST ONE FLANGE PROJECTING THEREFROM AND ASSEMBLING METHOD

CROSS-REFERENCE TO RELATED APPLICATIONS

This application claims priority to EP application Serial No. 21382934.4 filed Oct. 15, 2021, the disclosure of which is hereby incorporated in its entirety by reference herein.

TECHNICAL FIELD

The present disclosure relates to camera modules and, in particular, to vision devices for motor vehicles including the camera modules. The present disclosure further relates to a method of assembling the camera modules.

BACKGROUND

Modern vehicles are increasingly equipped with vision devices as part of advanced driver assistance systems (ADAS). Such vision devices may be embodied as digital rear view mirrors, also known as camera monitoring systems (CMS) with a display for displaying an exterior image of the vehicle. Further, a vision device may include a front camera module, a back camera module and/or any camera module arranged in the vehicle providing different views such as a front-view, a rear-view, a surrounding view, a top-view or bird's eye view, etc. In addition, the vision system may also contain object detection and warning systems, and vehicle trajectory prediction apparatuses. The vision devices may be part of autonomous motor vehicles.

Vision devices include a video camera module, a controller or electronic control unit (ECU), and a display of, for example, a Liquid Crystal Display (LCD), Light-Emitting Diode (LED), Organic Light-Emitting Diode (OLED) type. The camera module is usually fitted in the motor vehicle facing outwards for capturing images. Images captured by the camera module are displayed on a display screen in real time, with a little delay and/or stored in a suitable memory.

Camera modules include a housing and at least one electronics carrier having at least one printed circuit board (PCB) received within the housing and an image sensor or imager connected to the printed circuit board.

Attachment of the electronics carrier to the housing is usually carried out by screws. The use of screws is time consuming and in practice, may give rise to problems particularly in automated assembling through robots.

Further approaches have been proposed such as for example the one disclosed in US20140313337 A1 where a vehicle vision system is provided including a camera module to be fitted in a vehicle windshield comprising an image sensor, a lens holder, and a lens that is attached to an electronics carrier by welding.

However, for example, attachment of the lens and the electronics carrier to each other through the use of either screws or welding has been found to be inefficient for avoiding or at least minimizing buckling or bending of parts such as the electronics carrier as a result of changes in temperature, for example.

Further, alternative attempts have been also made for attaching the lens, the electronics carrier and the camera housing. For example, US20190381952 A1 discloses a vehicle vision system that includes a camera housing, an electronics carrier, and a lens barrel supporting a lens. The lens barrel is attached to the camera housing through adhesive applied to the lens barrel. Adhesive is also essentially used for attaching the electronics carrier to the camera housing.

Furthermore, one drawback of prior art cameras is that depending on the application, the length of the lens may change and consequently the camera housing has to be changed in shape and/or geometry to receive the lens. This entails that the camera housing will need to be redesigned when changing the application of the camera.

CN208156394U shows a camera having a lens with a heater that is arranged perimetrically around the lens in order to heat the lens for automatic defrosting and defogging in cold or wet weather conditions or environments. A wire is connected to the heating device running through the lens body.

It would be therefore desirable to provide an improved camera module in order to obviate the above-mentioned drawbacks and to provide advantageous solutions to the shortcomings in the prior art.

SUMMARY

A camera module is provided herein which at least avoids the disadvantages of the prior art and which provides a number of further significant advantages. In particular, the camera module of the present invention solves the problem of redesigning a camera housing when the camera module is provided for another application.

This is achieved by a camera module comprising a lens assembly, an electronics carrier and a housing, where at least one positioning portion is provided for attaching the lens assembly and the electronics carrier to each other; and additionally the lens assembly comprises at least one first flange projecting radially outwards from the lens assembly perpendicular to the optical axis, with the first flange and the inner surface of the housing capable of being attached to each other. Therefore, the present camera module allows housings with the same size to be used with lens assemblies having different lengths.

The present camera module comprises the housing having an interior space. The interior space of the housing has an inner surface. The housing may comprise a first housing part and a second housing part that may be coupled with each other to form the housing with the inner surface therein defining a space there between for receiving at least an electronics carrier and an image sensor. Preferably, the housing may comprise a front housing and a back housing. The front housing and the back housing may be coupled with each other to form the housing with the inner surface therein. At least one of the front housing and the back housing may be made for example of aluminum or any non-ferrous alloy material comprising aluminum such as Zamak although other materials are possible. The front housing and the back housing may define a space there between for receiving an electronics carrier that will be described below.

An electronics carrier is also provided. As used herein, an electronics carrier refers to any element that is suitable for carrying electronics to be placed within the camera module housing for operation of the camera module. The electronics carrier may comprise at least one printed circuit board (PCB) and optionally any other substrate having electronics. Each printed circuit board has two main surfaces. An image sensor or imager is arranged on one of the main surfaces of the printed circuit board, in optical communication with a lens assembly or lens barrel which will be described further below.

The camera module further comprises a lens assembly. The lens assembly in turn comprises a lens body with one or more lenses arranged at least partially within the above-mentioned interior space of the housing. The lens assembly defines a straight line passing through the geometrical center of the lens body that defines the path along which light is propagated through the lenses. The line will be hereinafter referred to as optical axis. If the lenses in the lens assembly have curved surfaces, the optical axis passes through the center of curvature of each curved surfaces of the lenses.

In use, the lens assembly and the electronics carrier are attached to each other, that is, the lens assembly may be attached to the electronics carrier or the electronics carrier may be attached to the lens assembly.

Attachment of the lens assembly and the electronics carrier to each other may be such that both elements are in direct or indirect contact with each other depending on specific requirements. For example, attachment of the lens assembly and the electronics carrier to each other may be carried out via an adhesive which will be also described further below.

The provided positioning portion serves the purpose of attaching the lens assembly and the electronics carrier to each other. The positioning portion may be part of or attached to the lens assembly. In particular, the positioning portion comprises at least one positioning element projecting longitudinally along the optical axis towards the electronics carrier. The positioning element serves the purpose of attaching the lens assembly and the electronics carrier to each other with a constant predetermined gap between the lens assembly and the electronics carrier and with the image sensor in optical alignment with the lens assembly. Provision of the positioning element results in a distance between the lens body and the imager being always controlled to be constant. Within the meaning of the present disclosure, a constant distance entails that the distance does not change during use. However, a constant distance also involves herein slight variations that may inevitably occur in operation due to external factors such as changes in temperature resulting in small expansions.

Alternatively, the position portion may be part of or attached to the electronics carrier abutting to the lens assembly, for example, the bottom surface of the lens assembly. In particular, the positioning portion comprises at least one positioning element projecting longitudinally along the optical axis towards the lens assembly.

The lens assembly further comprises at least one first flange projecting radially outwards from the lens assembly, perpendicular to the optical axis. The first flange and the inner surface of the housing can be attached to each other through an adhesive which will be described below. Attachment of the lens assembly to the housing may be carried out with direct or indirect contact between the first flange of the lens assembly and the inner surface of the housing depending on specific requirements.

The first flange may be circular at least partially covering the perimeter of the lens assembly defining an annular flat surface. The first flange may be defined by a continuous surface or by a surface having openings or it may be defined by segments.

At least one second flange may be also provided. The second flange is arranged projecting radially outwards from the lens assembly, perpendicular to the optical axis and arranged at a distance away from the first flange. The second flange is configured to serve as a guide for the positioning of a heater element that will be described below.

As with the first flange, the second flange may be circular at least partially covering the perimeter of the lens assembly defining an annular flat surface. The second flange may be defined by a continuous surface or by a surface having openings or it may be defined by segments.

The first flange may be positioned farther away from the electronics carrier than is the second flange.

As described above, the housing comprises a front housing and a back housing that can be coupled with each other. The front housing is configured for at least partially receiving a portion of the lens body of the lens assembly.

A third flange may be formed, in particular projecting radially outwards from the housing.

The third flange acts as a stop or movement restriction element when the lens assembly is inserted from below into the housing. In use, the first flange may be arranged inside the housing, below the third flange.

Each flange includes a first surface which is an upper surface, a second surface which is a bottom surface, and a third surface which is a side surface. The upper and bottom surfaces are joined to each other by the side surface. Once the camera module is assembled, an upper surface as set forth herein includes a surface of the flange that is located further away from the electronics carrier while a bottom surface as set forth herein includes a surface of the flange that is located opposite the upper surface. The side surface is thus arranged between the upper surface and the bottom surface in each flange.

The side surface of third flange defines a diameter. The diameter of the third flange is greater than the perimeter surface of the lens assembly arranged between a front surface of the lens assembly and the upper surface of the first flange. The front surface of the lens assembly is the surface of the lens assembly that is located farthest from the image sensor. Furthermore, the side surface of the first flange defines a diameter. The diameter of the first flange is greater than the diameter of the third flange. Also, the diameter of the first flange is smaller than the diameter of the lateral surface of the housing such that the housing, in use, at least surrounds the side surface and the bottom surface of the first flange.

The third flange is formed in the first housing part, particularly in the front housing. In use, an upper surface of the first flange is attached to a bottom surface of the third flange.

Once the lens assembly and the electronics carrier are attached to each other and the lens assembly and the inner surface of the housing are attached to each other, the first flange is located between the third flange and the second flange. This is, the upper surface of the first flange is arranged between the upper surface of the third flange and the upper surface of the second flange. Further, the bottom surface of the third flange is arranged between the upper surface of the third flange and the upper surface of the first flange. Further, the bottom surface of the first flange is arranged between the bottom surface of the third flange and the upper surface of the second flange.

A sub-assembly is defined by the lens assembly and the electronics carrier. A relative movement between the sub-assembly and the housing may occur according to at least one of the following:
  i) the upper surface of the first flange moves towards the bottom surface of the third flange such that the bottom surface of the third flange contacts an attaching mechanism and the upper surface of the first flange, which is the case when the lens assembly is arranged below the housing and moves away from the electronics carrier; or ii) the bottom surface of the third flange moves towards the upper surface of the first flange such that the upper surface of the first flange contacts an attaching mechanism and the bottom surface of the third flange, which is the case when the lens assembly is arranged below the housing and the housing moves towards the electronics carrier.

The location of the lens assembly below the housing includes a relative position of the lens assembly closer to the electronics carrier than the housing.

The third flange may be circular at least partially covering the perimeter of the housing defining an annular flat surface. The third flange may be defined by a continuous surface or by a surface having openings or it may be defined by segments.

Any of the first and second flanges formed in the lens assembly and the third flange formed in the housing may be formed integral with at least one of the lens assembly and the housing respectively or they may be separate elements.

The provision of one or more of the first, second and third flanges allows a sub-assembly formed by the lens assembly and the electronics carrier to be mounted to the housing easily, with the third flange abutting against the first flange when the lens assembly is inserted from below while keeping a distance between lens assembly and the electronics carrier constant.

A heater element may be provided for resistive heating of the lens body. The purpose of the heater element is converting electrical energy into thermal energy for heating the lens assembly as an electrical current flows there through. As a result, a defrosting effect is provided, as well as removal of obstacles and any water-based obstructions that may be attached to the lens body, which may result in undesired optical contamination.

The heater element preferably comprises a thin film, foil, or sheet material with electrical resistance. The thin film, foil, or sheet material of which the heater element is made is preferably of a malleable nature such that it can be easily bent. The thin film, foil, or sheet material is electrically conductive so as to act as a Joule effect heater. A preferred thickness for the thin film, foil, or sheet material of the heater element is within the range of 0.2-0.3 mm, such as 0.22 mm. A diameter of the lens body may be, for example, 19.3 mm such that the thin film, foil, or sheet material of the heater has such a malleability that it can advantageously assume a bending radius of about 10 mm.

The heater element is arranged preferably at least partially surrounding the lens body, wrapping an outer side surface thereof. The heater element may be arranged wound more than one turn around the outer side surface of the lens body so that, in use, an overlapping portion is defined by two opposite edges of the sheet material of the heater element. Thus, in practice, the heater element is adhered to and closes the perimeter of the lens body by overlapping two ends of the heater foil. The overlapping portion ensures that the thin film, foil, or sheet material does not come loose and is adhered to the lens body.

The heater element may have a connector member or conductor portion extending therefrom towards the electronics carrier for electrically connecting to an electrical power unit for the supply of electrical current. The electronics carrier has at least one opening through which the connector member of the heater element is allowed to pass. The connector member may be configured as a thin band comprising welding pins which in use pass through holes provided in the electronics carrier to be electrically connected to a surface of a printed circuit board. In some examples, the heater could be provided with a plurality of connector members or conductor portions extending therefrom towards the electronics carrier for electrically connecting to an electrical power unit for the supply of electrical current.

The heater element may be preferably arranged between the above mentioned first and second flanges of the lens assembly. In this way the positioning of the heater element is greatly facilitated. As described above, the second flange is configured for guiding the positioning of the heater element.

The heater element is attached to the lens assembly in contact therewith. In particular, the heater element is attached to an outer side surface of the lens body preferably in direct contact thereto. An adhesive may be applied on at least one of the outer side surface of the lens body and an inner surface of the thin film, foil, or sheet material of the heater element.

The thin film, foil, or sheet material is flat before being applied to the lens body. During assembling process, the thin film, foil, or sheet material of the heater element is bent in such a way that the inner side of the foil contacts the outer side surface of the lens body.

The flat nature of the heater element configured as a thin film, foil, or sheet material allows it to be applied surrounding the lens assembly. This has been found to provide high efficiency in heating of the lens body as no gaps exist between the heat source and the object to be heated. It has been also found that the flat nature of the heater element around the lens assembly provides a quick heating of the lens body. For example, a prior art camera heater is capable of heating the lens body to 40° C. in 3 minutes, while the present camera module having the same heater as described above has been found to be capable of heating the same lens in 2 minutes to the same temperature.

With the heater as described above, the heat supplied to the lens body is not transferred directly to the electronics carrier so that buckling or bending of the electronics carrier is prevented to a large extent as a result of which imager-lens alignment is ensured. In general, the notion of buckling or bending the electronics carrier in camera modules may be more likely to occur usually under wide temperature ranges are present depending on the environment where camera modules are operating, which adds to the heat from the electronics carrier. If the heater were to provide direct heat to the lens body, usually up to about 40-50° C., this would unavoidably result in bending, flexing, expanding or bulging of the printed circuit board in the electronics carrier resulting in undesirable shifting of the lens body and thus loosing of the optical connection with the image sensor. For example, it has been found that at 50° C., the average deviation in prior art cameras is of the order of 68 micrometers usually leading to image quality issues. With the camera module described herein, the average relative deviation of the lens body and the image sensor has been found to be advantageously reduced up to 11 microns.

According to an advantageous feature of the present camera module, adhesive may be applied as stated above, in particular to one or more of the following.

The adhesive may be applied between the positioning portion and the electronics carrier. In particular, the adhesive may be applied between the positioning element of the lens assembly and the electronics carrier. In this case, the adhesive may be for example a 1-3 mm thick layer of glue arranged to form a circular ring. The adhesive is dispensed in an uncured or at least partially cured state around a surface of the lens assembly for adhesively attaching or bonding the electronics carrier and the lens assembly with each other.

The adhesive may be also applied between the first flange in the lens assembly and the inner surface of the housing. The adhesive in this case may be applied to any suitable surface of the first flange. In particular, the adhesive may be applied to an upper surface of the first flange, that is, an upper surface of the first flange opposite the electronics carrier that is positioned farthest away there from. Additionally or alternatively, the adhesive may be applied to a perimeter surface of the lens body adjacent the flange. In general, the adhesive may be applied to any surface of the first flange, such as an end surface, i.e. a side surface thereof, and/or a bottom surface, i.e. a surface thereof opposite the upper surface, of the first flange. For example, a 2-3 mm thick layer of glue may be applied on the front housing and/or on the lens body to attach them together. Also in this case, the adhesive may be applied to form a circular ring of glue dispensed in an uncured or at least partially cured state around the inner surface of the housing for adhesively attaching or bonding the lens assembly to the front housing.

The adhesive may be also applied between the heater element, if provided, and an outer side surface of the lens body.

In all the above cases, the adhesive may comprise any suitable adhesive, such as a UV-curable adhesive that, when cured, provides a strong bonding for the above-mentioned parts, namely the lens assembly, the electronics carrier, the housing, and the heater. The above-mentioned adhesive may be cured to a first curing level by exposure of the adhesive to light or through a UV curing process and is cured to a second higher curing level through a thermal curing process.

The positioning element may comprise a rim or perimeter edge, that may be configured or shaped as one or more legs, may be formed on a bottom surface of the lens assembly. Additionally or alternatively, the rim or perimeter edge may be formed on or attached to the surface of the printed circuit board where the imager is coupled. Such rim allows the imager to be well protected in cooperation with the lens assembly and the electronics carrier. Providing a rim extending through the entire perimeter of the positioning element prevents foreign matter such as dust from entering the camera module and reaching image sensor.

A method of assembling the above-described camera module is also disclosed herein.

The assembling method comprises attaching the lens assembly to the electronics carrier so as to establish a proper optical communication between the lens assembly and the image sensor. The assembling method may also comprise providing an adhesive on at least one of the positioning portion and the electronics carrier as described above for attaching the lens assembly and the electronics carrier to each other.

The assembling method may also comprise partial insertion of the lens assembly into the front housing with the first flange acting as a stopper. The lens assembly may be fitted from bottom to top, that is, by moving away from the electronics carrier, such that the first flange is always inside the front housing. Other relative assembling directions are also possible moving the lens assembly and the electronics carrier in directions to each other than that described above.

The lens assembly is then attached to the housing through the use of an adhesive applied on at least one of the inner surface of the housing and the first flange.

The assembling method may also comprise mounting the image sensor to the electronics carrier.

A step of providing a heater element on a side surface of the lens body, for example once the lens assembly and the electronics carrier have been attached to each other, with the heater element at least partially surrounding the lens assembly, may be also performed. The heater element may be attached to the lens body by applying an adhesive on at least one of an inner surface of the heater element and the outer side surface of the lens assembly, wrapping the heater element around the lens assembly such that the inner surface of the heater element is properly attached to the outer side surface of the lens assembly. The adhesive is cured through light, air, or temperature, for example by introducing the camera module into an oven or climate chamber.

Once the heater has been correctly positioned around the lens, the sub-assembly formed by the lens and the electronics carrier may be fitted to the camera housing. The front housing is mounted on the sub-assembly. The camera module is assembled by fitting the subassembly formed by the lens assembly, optionally with the heater, and the electronics carrier until the third flange acts as a stop.

The lens assembly may be moved before curing the adhesive for ensuring proper optical alignment between the lens assembly and the image sensor. The heater element is electrically connected through the connector member to a power unit by passing at least one portion of the connector member through a passageway in the electronics carrier and attaching the connector member to the electronics carrier.

The lens assembly may be moved with the heater element and the electronics carrier, and the housing towards each other such that the first flange of the lens assembly abuts the housing, and the lens assembly and the housing are permanently attached to each other by the adhesive.

The back housing may be coupled with the front housing. The assembling method may also comprise placing a camera housing surrounding the heater, the electronics carrier, the image sensor, and at least one portion of the lens assembly.

The camera module may be fitted to a vehicle bodywork such that at least one portion of the lens body is out of the vehicle facing outwards, with the camera module being connected to the vehicle. Other locations are possible. For example, the camera module may have a transparent cover fitted for example to the barrel housing or anywhere in the first housing part or front housing such that the lens body in this case is not out of the vehicle but the cover.

The described configuration results in a great number of significant advantages.

In contrast to prior art camera modules, no screws or welding are required for attaching the front housing and the back housing and for attaching the electronics carrier to the front housing. Therefore, thickness of the housing is significantly reduced resulting in less material being involved in the camera module while still providing the same or higher efficiency. As a result, an effective, cost effective, lighter camera module is obtained.

In addition, attachment of the electronics carrier to the lens assembly through the adhesive allows the camera to maintain focus consistently regardless of variations in ambient temperature. Shrinkage and expansion of the cured adhesive under temperature variations are suitably accommodated. An optimum optical communication between the lens assembly and the image sensor is achieved due their mutual proper optical alignment. This is carried out without the use of screws or welding. Furthermore, the first flange of the lens assembly attached to the front housing, and the electronics carrier attached to the lens assembly, also the imager remains optically aligned with the lens assembly in the housing. This is relevant to the design of automotive video cameras where an optimal positioning and attachment of the lens assembly relative to the image sensor is sought.

The use of adhesive in the present camera module also compensates for movements of the lens assembly and the image sensor. This advantage, in combination with the above, allows the present camera module to meet current automotive safety requirements demanding high image quality stability with no variations in camera focus over the lifetime of the camera module.

With the present camera module, problems due to generated heat and thus their negative effects on camera module parts are reduced. Bending of the electronics carrier has been found to be reduced since heat generated by the heater is not directly transmitted to the lens assembly so that temperature therein is not increased and thus no heat is added to that produced by the electronics carrier itself. The electronics carrier is thus not overheated and therefore not expanded, so no or little bending occurs. As a result, the optical communication, i.e., the alignment between the imager and the lens assembly, is not affected. In contrast, heat produced in prior art camera modules results in bending or buckling of the printed circuit board of the electronics carrier resulting in the image sensor to move or deflect to an undesirable extent such as of the order of 68 micrometers while. In the present camera module, the deflection of the image sensor or imager has been found to be advantageously reduced up to 11 micrometers. Losing the optical connection of the lens and the imager contained in the electronics carrier is thus avoided.

In addition to lightness due to reduced thickness and excellent optical alignment between the lens body and the imager, as well as heating efficiency from direct contact between the heater and the lens body, a modular structure is provided. Modularity advantageously results from attachment of the electronics carrier and the lens assembly together with position and movement relationship between the first flange and the third flange of the lens assembly and the housing, respectively.

The present camera module has a modular design that results from the particular advantageous provision of flanges for attachment of the lens assembly, the housing, and the electronics carrier, such as the above mentioned first flange acting as stop to the third flange when the housing is mounted from top to bottom or when the lens is mounted from bottom to top. The first and second flanges formed in the lens assembly and the third flange formed in the housing act as stops for restriction of relative movements of the lens body and the housing.

The modular nature of the present camera module allows housings with the same size to be used with lens assemblies with different sizes, that is, the same housing is capable of receiving lenses having different lengths. For example, should a 120°×58° lens assembly be required and later a 190°×150° lens assembly be also required having different size, in particular, different length, in this particular case, shorter length, then the same housing size can be delivered. This entails that although the required lens assemblies are of different lengths, front and back housings having the same size can still be employed. As a result, different camera modules having different resolutions and field of views for different applications can be provided using front and back housings having the same sizes for different lens assemblies having different lengths depending on the application such as, for example, front cameras, rear parking cameras, cameras for intelligent rearview mirror systems (IRMS), side cameras for camera monitoring systems (CMS), side cameras for blind spot detection (BSD), etc.

The constant predetermined distance between the lens assembly and the electronics carrier with the image sensor in optical alignment with the lens assembly due to the positioning element is obtained regardless the length of the lens. The distance between the lens assembly and the imager, referred in the field to as "through-the-lens (TTL) metering" to be varied before completing the assembling process as required with the same electronics carrier, imager and front housing. Further, the TTL metering is constant once the assembly process is completed.

For reasons of completeness, various aspects of the present disclosure are set out in the following numbered clauses:

Clause 1: A lens assembly comprising:
a lens body with one or more lenses defining an optical axis;
an electronics carrier; and
an image sensor arranged on a surface of the electronics carrier in optical communication with the lens assembly;
in that the lens assembly further comprises:
a heater element for resistive heating of the lens body, the heater element comprising a sheet material with electrical resistance arranged at least partially surrounding the lens body wrapping an outer side surface thereof for removing any water-based obstructions that may be attached to the lens body as an electrical current flows there through.

Clause 2: The lens assembly according to clause 1, wherein the heater element is arranged wound more than one turn around the outer side surface of the lens body so that, in use, an overlapping portion is defined by two opposite edges of the sheet material of the heater element.

Clause 3: The lens assembly according to clause 1 or 2, wherein the heater element has a connector member for electrically connecting to an electrical power unit for feeding electrical current thereto.

Clause 4: The lens assembly according to any of the preceding clauses, wherein it further comprises an adhesive applied between the heater element and the outer side surface of the lens body.

BRIEF DESCRIPTION OF THE DRAWINGS

Non-limiting examples of the present disclosure will be described in the following, with reference to the appended drawings.

In the drawings:

FIG. 4 is a top plan view of the camera module shown in FIGS. 1-3;

FIG. 5 is a sectional top view of the camera module shown in FIGS. 1-3 taken along line BB of FIG. 3;

FIG. 6 is a fragmentary enlarged sectional view of a camera module shown in FIGS. 1-3 to better illustrate some portions thereof.

DETAILED DESCRIPTION

Figure 1:
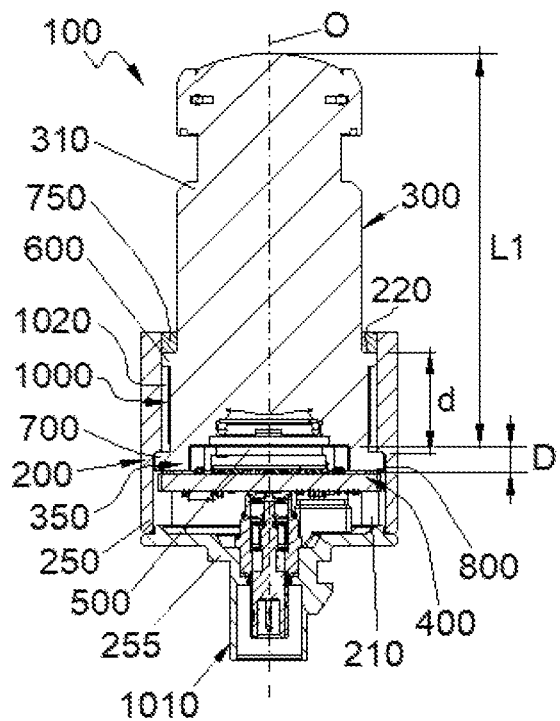
FIGS. 1, 2 and 3 are sectional views taken along line AA of FIG. 4 corresponding to different examples of camera modules provided with three different types of lens assemblies of different length, respectively.
Figure 2:
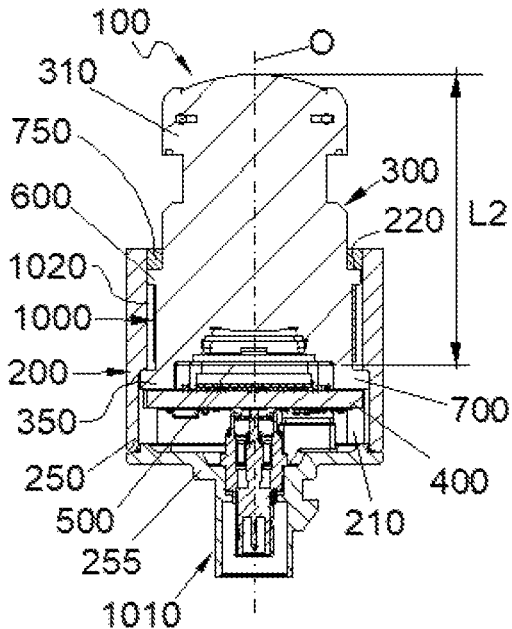
Figure 3:
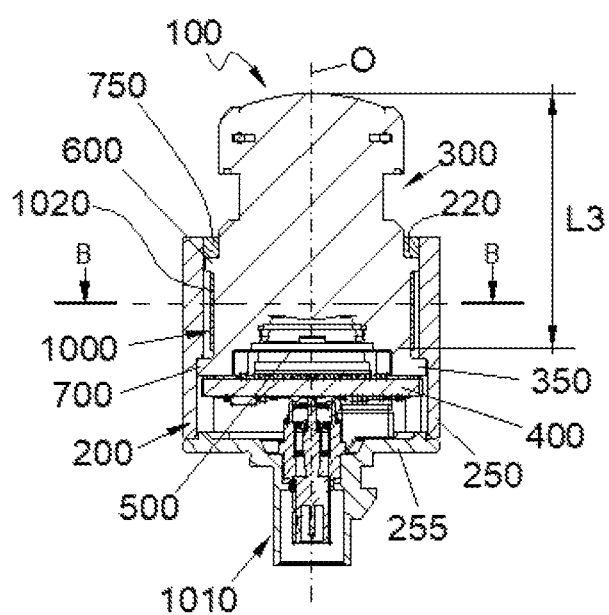
Figure 7:
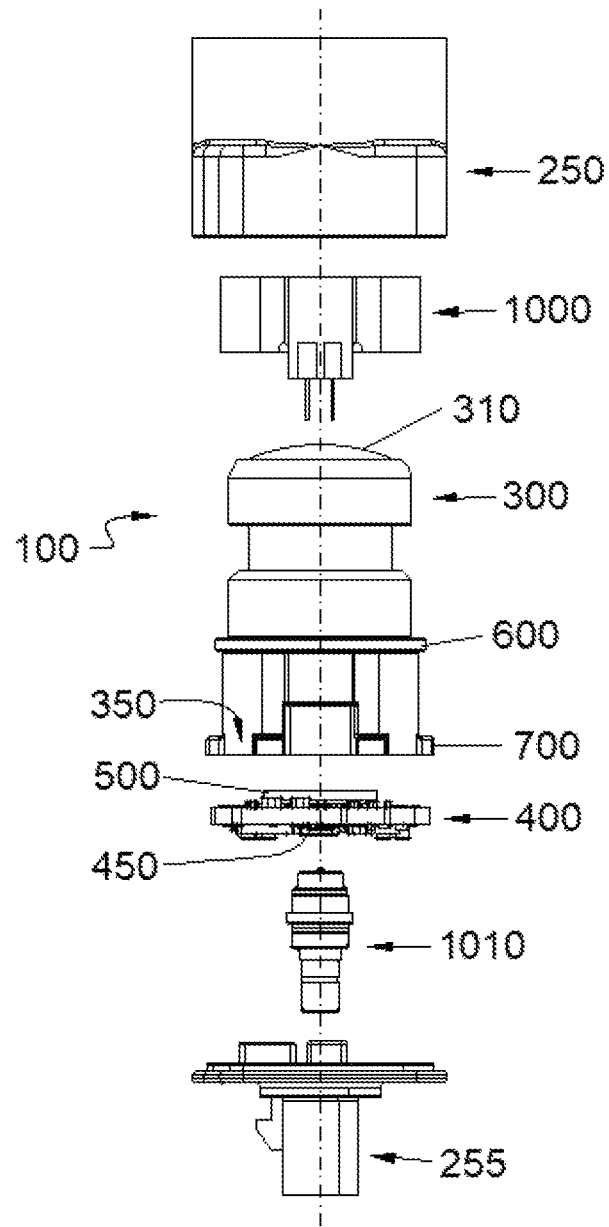
FIG. 7 is an exploded view of the camera module.

In the examples shown in the FIGS. 1-7 of the drawings, the camera module 100 comprises a housing 200 that is made, for example, of aluminum. An interior space 210 is defined inside the housing 200. The interior space 210 of the housing 200 is suitable for receiving therein a lens assembly or lens barrel 300 that comprises a lens body 310 as it will be described further below. Lens assemblies 300 with lens bodies 310 of different lengths are illustrated in FIGS. 1, 2, 3. They will be also described further below.

The interior space 210 of the housing 200 has an inner surface 220. The housing 200 comprises a front housing 250 and a back housing 255 than can be coupled with each other so as to form the housing 200, as shown in FIGS. 1, 2, 3, and 7. The front housing 250 is configured for at least partially receiving a portion of the lens body 310 of the lens assembly 300.

An electronics carrier 400 is provided between the front housing 250 and the back housing 255. The electronics carrier 400 comprises one or more printed circuit boards (PCB), not shown, and required substrates having electronics. The electronics carrier 400 includes an image sensor or imager 500 that is connected to one surface of the electronics carrier 400. The image sensor 500 is arranged in optical communication with the lens assembly 300. The lens assembly 300 and the electronics carrier 400 define a sub-assembly 300-400.

Within the meaning of the present disclosure, and according to the figures of the drawings, an upper relative position of an element refers to a position of that element further away from the electronics carrier 400 than a bottom relative position, while a bottom relative position of an element refers to a position of that element closer to the electronics carrier 400 than the upper relative position.

The lens assembly 300 comprises a lens body 310 with one or more lenses as described above. The lens body 310 may be of different lengths L1, L2, L3, as shown in FIGS. 1, 2 and 3 of the drawings, depending on required resolutions and field of views according to intended applications.

The lens body 310 is arranged within the interior space 210 of the housing 200 as stated above. In use, the lens assembly 300 and the electronics carrier 400 are attached either in direct or indirect contact with each other depending on specific requirements through adhesive 800 as depicted in FIG. 1.

The adhesive 800 for attachment of the lens assembly 300 and the electronics carrier 400 to each other for forming the above-mentioned sub-assembly 300-400 is applied between a bottom portion of the lens assembly 300 and the electronics carrier 400. More specifically, the adhesive 800 is applied between a positioning portion of the camera module 100, that will be described in detail below, and the electronics carrier 400. The adhesive 800 in this example comprises a 1-3 mm thick layer of glue applied to form a circular ring dispensed in an uncured or at least partially cured state around the above-mentioned bottom portion of the lens assembly 300 such that the lens assembly is adhesively attached or bonded to the electronics carrier 400.

The geometry of the lens body 310 defines a straight line referred herein to as optical axis O. As shown in FIGS. 1, 2, 3 and 7 of the drawings, the optical axis O extends lengthwise through the geometrical center of the lens body 310. The optical axis O defines a path along which light is propagated through the lenses of the lens assembly 300.

The camera module 100 comprises a positioning portion. In turn, the positioning portion comprises a positioning element 350 that is formed in the lens assembly 300 as shown in FIGS. 1, 2, 3 and 7. The positioning element 350 is adapted for attaching the lens assembly 300 and the electronics carrier 400 to each other with a constant predetermined gap or distance D between them, as depicted in FIG. 1. In this way, the distance D between the lens body 310 and the image sensor 500 is controlled to be constant with the image sensor 500 in optical alignment with the lens body 310 of the lens assembly 300. An accurate optimal position of the lens body 310 with respect to the image sensor 500 is advantageously ensured.

The positioning element 350 is formed in a bottom portion of the lens body 310 and projects longitudinally along the optical axis O towards the electronics carrier 400, as shown in FIGS. 1, 2, 3 and 7 of the drawings.

First and second flanges 600, 700 are formed in the lens assembly 300 as shown in FIGS. 1, 2, 3 and 7.

The first flange 600 is formed at an upper portion of the lens body 310, that is, the first flange 600 is located further away from the electronics carrier 400 than the second flange 700 that will be described below.

The first flange 600 extends over a portion of the outer perimeter of the lens body 310 defining a flat surface. The first flange 600 projects radially outwards from the lens body 310, perpendicular to the optical axis O. In use, the first flange 600 is attached to the inner surface 220 of the housing 200, either in direct or indirect contact therewith depending on specific requirements. Attachment of the lens assembly 300 to the housing 200 is carried out through adhesive 900 as shown in FIG. 6. The adhesive 900 is applied to surfaces of the first flange 600 of the lens assembly 300, as it will be described below, in contact with the inner surface 220 of the housing 200. The inner surface 220 in the examples shown is on a corresponding upper surface of a third flange 750 formed in the interior space 210 of the housing 200 as it will be explained further below.

More specifically, and referring to FIG. 6, the adhesive 900 is applied between the first flange 600 formed in the lens body 310 of the lens assembly 300 and the inner surface 220 of the housing 200. More in particular, and still referring to FIG. 6 of the drawings, the adhesive 900 for attachment of the lens assembly 300 to the housing 200 is applied between an upper surface U, defined below, of the first flange 600 of the lens body 310 and a corresponding bottom surface, not designated in FIG. 6, of the third flange 750 formed in the housing 200 as it will be described further below. As shown in FIG. 6, the adhesive 900 is also applied between a side surface S, defined below, of the first flange 600 at least partially covering an outer perimeter thereof, where required, and a corresponding side surface, not designated in FIG. 6, of the third flange 750 as it will be also described further below.

In the non-limiting examples shown, the adhesive 900 is a 2-3 mm thick layer of glue applied as described above to form a circular ring of glue dispensed in an uncured or at least partially cured state suitable for adhesively attaching or bonding the lens assembly 300 to the housing 200, in particular to the front housing 250.

The second flange 700 is formed opposite the first flange 600, at a bottom portion of the lens body 310, extending over at least one portion of the outer perimeter of the lens body 310 for the purpose of guiding the assembly of a heater element 1000 that will be described below. The second flange 700 is located closer to the electronics carrier 400 than the first flange 600 as described above, with a distance d being defined between the first flange 600 and the second flange 700. As with the first flange 600, the second flange 700 projects radially outwards from the lens body 310 perpendicular to the optical axis O.

As stated above, a third flange 750 is also provided. The third flange 750 extends over a portion of the inner perimeter of the housing 200, in particular, of the front housing 250, defining a flat surface, as shown in FIGS. 1, 2, and 3. As with the first flange 600 and the second flange 700, the third flange 750 projects radially outwards from the housing 200. The third flange 750 is configured to act as a stop when the lens assembly 300 is inserted from below into the housing 200, that is, away from the electronics carrier 400. In use, the first flange 750 is arranged within the interior space 210 of the housing 200, below the above mentioned third flange 750.

The first, second, and third flanges 600, 700, 750 in the camera module 100 are intended for facilitating assembling the sub-assembly 300-400 to the housing 200.

Reference is again made to FIG. 6. The first, second, and third flanges 600, 700 750 each have an upper surface U, a bottom surface B, and a side surface S as described above. Reference to the first, second, and third flanges 600, 700 750 is made in the drawings only to the first flange 600 for the sake of clarity. Thus, it is to be understood that the upper, bottom and side surfaces U, B, S are defined for every flange in the camera module 100.

The upper and bottom surfaces U, B of the flanges 600, 700, 750 are joined to each other by the above-mentioned side surface S. As previously stated, the upper surface U in each first, second, and third flanges 600, 700 750 is located further away from the electronics carrier 400 than the bottom surface B. In turn, the bottom surface B in each first, second, and third flanges 600, 700 750 is located opposite the upper surface U, closer to the electronics carrier 400 than the upper surface U. In use, the upper surface U of the first flange 600 is attached to a bottom surface of the third flange 750, as shown in FIG. 6. It is to be noted that the upper surface and the bottom surface of the third flange 750 are part of the above-mentioned inner surface 220 of the housing 200.

Once the lens assembly 300 and the electronics carrier 400 are attached to each other and the lens assembly 300 and the inner surface 220 of the housing 200 are attached to each other, the upper flange 600 is located between the third flange 750 and the second flange 700. This is, the upper surface U of the first flange 600 is arranged between the upper surface of the third flange 750 and the upper surface of the second flange 650. Further, the bottom surface of the third flange 750 is arranged between the upper surface of the third flange 750 and the upper surface U of the first flange 600. Further, the bottom surface of the first flange 600 is arranged between the bottom surface of the third flange 750 and the upper surface of the second flange 700.

A relative movement between the sub-assembly 300-400 and the housing 200 may occur (e.g., start) when the lens assembly 300 is arranged such that there is a predetermined distance between the upper surface U of the first flange 600 and the bottom surface of the third flange 750 being the upper surface U of the first flange 600 arranged between the bottom surface of the third flange 750 and the bottom surface of the first flange 600. Subsequently, the predetermined distance between the upper surface U of the first flange 600 and the bottom surface of the third flange 750 is reduced until the upper surface U of the first flange 600 and the bottom surface of the third flange 750 come into direct contact or the upper surface U of the first flange 600 and the bottom surface of the third flange 750 are spaced to each other as much as the thickness of the adhesive that attached both surfaces.

A relative movement between the sub-assembly 300-400 and the housing 200 may occur when the lens assembly 300 is arranged below the housing 200 and moves upwards away from the electronics carrier 400. In this case, the upper surface U of the first flange 600 moves upwards, away from the electronics carrier 400, towards the bottom surface of the third flange 750 such that the bottom surface of the third flange 750 contacts the adhesive 900 and the upper surface U of the first flange 600.

A relative movement between the sub-assembly 300-400 and the housing 200 may also occur when the lens assembly 300 is arranged below the housing 200 and the housing 200 moves downwards to the electronics carrier 400. In this case, the bottom surface of the third flange 750 moves downwards towards the upper surface U of the first flange 600 such that the upper surface U of the first flange 600 contacts the adhesive 900 and the bottom surface B of the third flange 750.

As stated above, the camera module 100 further comprises a heater element 1000 as shown in FIGS. 1, 2, 3 and 6, 7 of the drawings. The heater element 1000 serves the purpose of heating the lens body 310 as required. This is carried out by converting electrical energy into thermal energy as an electrical current flows through the material of the heater element 100. As a result, the lens assembly 300 is heated and thus defrosted as required. Obstacles and any water-based obstructions that may be attached to the lens body 310 can be also removed. Optical contamination is efficiently avoided.

For this purpose, the heater element 1000 comprises a malleable thin film made of an electrically conductive material with electrical resistance so as to act as a Joule effect heater. The heater element 1000 can be thus easily bent. In the non-limiting example shown, the heater element 1000 is 19.3 mm in diameter and 0.22 mm thick although other values are envisaged. The heater element 1000 is capable of assuming a bending radius of about 10 mm.

In use, the heater element 1000 is strongly adhered to an outer surface of the lens body 310, surrounding an outer perimeter thereof. For this purpose, adhesive 1020, as shown in FIGS. 1, 2, 3, and 6, are applied on at least one of the outer side surface of the lens body 310 and an inner surface of the heater element 1000.

The heater element 1000 in the example shown is wound more than one turn around the outer perimeter of the lens body 310 such that an overlapping portion is defined by two opposite edges of the film material of the heater element 1000.

The flat nature of the heater element 1000 allows the heater element 1000 to be suitably adhered to the outer surface of the lens body 310. As a result, high efficiency in heating of the lens body is obtained as no gaps exist between the heater element 1000 and the lens body 310 when heated. Also, the flat nature of the heater element 1000 arranged around the lens body 310 provides a quick heating of the order of 2 minutes for reaching a lens body temperature of the order of 40° C. As a result of heat supplied to the lens body 310 not being transferred directly to the electronics carrier 400, bending of the electronics carrier 400 is prevented and optical alignment of the lens assembly 300 and the image sensor 500 is ensured for optimal image quality.

As shown in FIGS. 1-3, the heater element 1000 is arranged between the above mentioned first flange 600 and second flange 700 of the lens assembly 300. The second flange 700 is suitable for guiding the heater element 1000. Mounting of the heater element 1000 is thus facilitated.

Now referring to FIGS. 1, 2, 3 of the drawings, a connector member 1010 projects from a bottom portion of the heater element 1000 towards the electronics carrier 400. As shown in detail in the exploded view of FIG. 7, the connector member 1010, in use, passes through an opening 450 that is formed in the electronics carrier 400. The connector member 1010 is intended for electrically connecting the heater element 1000 to an electrical power unit, not shown, for the supply of electrical current. The electrical power unit may be a separate element of the camera module 100.

Assembling of the above-described camera module 100 is carried out by attaching the lens body 310 of the lens assembly 300 to the electronics carrier 400 establishing an optical communication between the lens assembly 300 and the image sensor 500 which has been previously mounted to the electronics carrier 400. The adhesive 800 is then applied on at least one of the positioning element 350 and the electronics carrier 400 for attaching the lens assembly 300 to the electronics carrier 400.

The heater element 1000 is then attached on the outer side surface of the lens body 310 by applying corresponding adhesive 1020 there between. The sub-assembly 300-400 is fitted to the front housing 250 once the lens assembly 300 and the electronics carrier 400 have been attached to each other. The first flange 600 of the lens assembly 300 will then act as a stopper for the sub-assembly 300-400 until abutting the third flange 750 of the housing 200.

The heater element 1000 attached to the lens body 310 is electrically connected to the electrical power unit through the above-mentioned connector member 1010. This is carried out by passing the connector member 1010 through the opening or passageway 450 that is formed in the electronics carrier 400. The connector member 1010 is attached to the electronics carrier 400.

It is to be noted that the lens assembly 300 may be fitted either from bottom to top in the drawings, moving the lens assembly 300 away from the electronics carrier 400. Alternatively, the housing 200 may be fitted from bottom to top in the drawings, moving the housing 200 away from the electronics carrier 400, such that the first flange 600 is within the interior space 210 of the front housing 250. The lens assembly 300 is then attached to the housing 200 through the adhesive 900 applied on the first flange 600, in particular applied between an upper surface U of the first flange 600 and a corresponding bottom surface of the third flange 750. As stated above, the adhesive 900 is also applied between a side surface S of the first flange 600 and a corresponding side surface of the third flange 750 for optimal attachment of the lens assembly 300 to the housing 200.

The lens assembly 300 may be moved before curing the adhesive 800, 900 for ensuring proper optical alignment between the lens assembly 300 and the image sensor 500.

The back housing 255 is then coupled with the front housing 250 and the assembled camera module 100 is finally fitted to a vehicle bodywork, not shown, such that at least one portion of the lens body 310 is out of the vehicle facing outwards, with the camera module 100 connected to the vehicle.

FIGS. 1, 2, and 3 of the drawings show three examples of camera modules 100 having three different types of lens assemblies 300 with corresponding lens bodies 310 of different lengths L1, L2, L3, respectively. The three examples shown in FIGS. 1, 2, and 3 of the drawings illustrate the modular character of the above-described camera module 100 where the same type of housing 200 used in the camera modules 100 of FIGS. 1, 2, and 3 can be used with lens assemblies 300 with different lengths.

In FIG. 1, the lens assembly 300 has a lens body 310 whose length L1 is longer than the length L2 of the lens body 310 of the lens assembly 300 shown in FIG. 2. The lens body 310 of the lens assembly 300 shown in FIG. 2 is in turn larger than the length L3 of the lens body 310 of the lens assembly 300 shown in FIG. 3. Thus, the same housing 200 of the camera module 100 shown in FIGS. 1, 2, and 3 is capable of receiving different lens bodies 310 having different lengths L1, L2, L3.

The modular character of the camera module 100 is no way limited to three different lengths L1, L2, L3, but many more different values for the length of lens body 310 for the same housing 200 may be applied.

Since the same front and back housings 250, 255 having the same sizes can be used for different lens assemblies 300 having lens bodies 310 with different lengths L1, L2, L3 depending on the application, different camera modules 100 having different resolutions and field of views can be used for different applications resulting in significant cost savings.

It is to be noted that the constant predetermined distance D, illustrated in FIG. 1, between the lens assembly 300 and the electronics carrier 400, with the image sensor 500 in optical alignment with the lens assembly 300 due to the positioning element 350, is obtained regardless the length L1, L2, L3 of the lens body 310. The distance between the lens assembly 300 and the image sensor 500 can be varied as required with the same electronics carrier 400, image sensor 500 and housing 200.

A number of examples have been disclosed herein. However, other alternatives, modifications, uses and/or equivalents of the examples described are possible. For example, one or more of the first, second and third flanges may be formed integral with the lens assembly and the housing or one or more of them may be separate elements. On the other hand, although flanges have been described as defining corresponding flat surfaces, one or more of the first, second and third flanges may be arranged to define an uneven or non-planar surface, such as a curved surface, a surface having a plurality of curvatures, etc. Furthermore, the adhesive disclosed herein may comprise any suitable adhesive product, such as a UV-curable adhesive that, when cured, provides a strong bonding for the lens assembly, the electronics carrier, the housing, and the heater. In general, any adhesive may be used that is curable to a first curing level by exposure to light or a UV curing process, and to a second higher curing level through a thermal curing process.

All possible combinations of the examples described herein are also thus covered. The scope of the present disclosure should not be limited by particular examples but should be determined only by a fair reading of the claims that follow. If reference signs related to drawings are placed in parentheses in a claim, they are solely for attempting to increase the intelligibility of the claim and shall not be construed as limiting the scope of the claim.

What is claimed is:

1. A camera module comprising:
  a housing having an interior space with an inner surface;
  a lens assembly comprising a lens body with one or more lenses arranged at least partially within the housing interior space and defining an optical axis;
  an electronics carrier; and
  an image sensor arranged on a surface of the electronics carrier in optical communication with the lens assembly;
  at least one positioning portion for attaching the lens assembly and the electronics carrier to each other; and
  at least one first flange projecting radially outwards from the lens assembly perpendicular to the optical axis, with the at least one first flange and the inner surface of the housing capable of being attached to each other such that the at least one first flange acts as a stopper when moving the lens assembly into the housing interior space, wherein a sub-assembly formed by the lens assembly and the electronics carrier is fitted to the housing once the lens assembly and the electronics carrier have been attached to each other, the at least one first flange of the lens assembly acts as a stopper for the sub-assembly until abutting a housing flange of the housing.

2. The camera module of claim 1, wherein the at least one positioning portion is part of or attached to the lens assembly, and wherein the at least one positioning portion, in turn, comprises a positioning element projecting longitudinally along the optical axis towards the electronics carrier for attaching the lens assembly and the electronics carrier to each other with a constant predetermined gap between the lens assembly and the electronics carrier with the image sensor optically aligned with the lens assembly.

3. The camera module of claim 1, wherein the lens assembly further comprises at least one second flange projecting radially outwards from the lens assembly perpendicular to the optical axis and arranged at a distance away from the at least one first flange.

4. The camera module of claim 1, wherein the housing includes a front housing and a back housing for being coupled with each other, the front housing being configured for at least partially receiving a portion of the lens body and including the inner surface for attaching the at least one first flange.

5. The camera module of claim 1 further comprising a heater element to resistively heat the lens body, the heater element including a sheet material with electrical resistance arranged at least partially surrounding the lens body wrapping an outer side surface thereof for removing any water-based obstructions that may be attached to the lens body as an electrical current flows there through.

6. The camera module of claim 5, wherein the heater element is arranged wound more than one turn around the outer side surface of the lens body so that, in use, an overlapping portion is defined by two opposite edges of the sheet material of the heater element.

7. The camera module of claim 5, wherein the heater element includes a connector member to electrically connect to an electrical power unit for feeding electrical current thereto.

8. The camera module of claim 5 further including a first adhesive applied between the at least one positioning portion and the electronics carrier or between a positioning element and the electronics carrier.

9. The camera module of claim 1 further including a first adhesive applied between the at least one first flange and the inner surface of the housing.

10. The camera module of claim 1 further including a first adhesive applied between a heater element and an outer side surface of the lens body.

11. The camera module of claim 10, wherein the heater element is arranged between the at least one first flange and a second flange of the lens assembly.

12. The camera module of claim 1, wherein one or more of the at least one first flange and a second flange of the lens assembly is arranged to extend at least partially surrounding the lens body.

13. A method of assembling a camera module including a housing, a lens assembly, an electronics carrier, and an image sensor, the method comprising:

providing a lens assembly including a lens body defining an optical axis, the lens assembly comprises at least one first flange projecting radially outwards from the lens assembly perpendicular to the optical axis;

attaching the lens assembly and the electronics carrier to each other so as to establish an optical communication between the lens assembly and an image sensor; and attaching the lens assembly to the housing by;
providing a first adhesive on at least one of an inner surface of the housing and the at least one first flange; and
moving the lens assembly and the housing towards each other such that the at least one first flange of the lens assembly abuts the inner surface of the housing so as to permanently attach the lens assembly and the housing to each other by the first adhesive,
wherein a sub-assembly formed by the lens assembly and the electronics carrier is fitted to the housing once the lens assembly and the electronics carrier have been attached to each other, the at least one first flange of the lens assembly acts as a stopper for the sub-assembly until abutting a housing flange of the housing.

14. The method of claim 13 further comprising performing one or more of:
mounting the image sensor to the electronics carrier;
providing a heater element on a side surface of the lens body;
providing a second adhesive on at least one of an inner surface of the heater element and/or an outer side surface of the lens assembly;
wrapping the heater element around the lens assembly such that the inner surface of the heater element is attached to the outer side surface of the lens assembly;
placing a camera housing surrounding the heater element, the electronics carrier, the image sensor, and at least one portion of the lens assembly;
curing the first adhesive and the second adhesive by one or more of temperature, light, air, or by introducing the camera module into an oven or climate chamber;
moving the lens assembly before curing the first and the second adhesive to ensure proper optical alignment between the lens assembly and the image sensor;
electrically connecting the heater element through a connector member to a power unit;
passing at least one portion of the connector member through a passageway in the electronics carrier and attaching the connector member to the electronics carrier;
moving the lens assembly, with the heater element and the electronics carrier, and the housing towards each other such that the at least one first flange of the lens assembly abuts the housing, and the lens assembly and the housing are permanently attached to each other by the first and the second adhesive;
coupling a back housing with a front housing; and
fitting the camera module to a vehicle bodywork such that one portion of the lens body is out of a vehicle facing outwards, with the camera module being connected to the vehicle.

15. A camera module comprising:
a housing having an inner surface;
a lens assembly comprising a lens body with one or more lenses arranged at least partially within the housing and defining an optical axis;
an electronics carrier; and
an image sensor arranged on a surface of the electronics carrier in optical communication with the lens assembly;

at least one positioning portion to attach the lens assembly and the electronics carrier to each other; and at least one first flange projecting radially outwards from the lens assembly perpendicular to the optical axis, with the at least one first flange and the inner surface of the housing capable of being attached to each other such that the at least one first flange acts as a stopper when moving the lens assembly into an interior space of the housing, wherein a sub-assembly formed by the lens assembly and the electronics carrier is fitted to the housing once the lens assembly and the electronics carrier have been attached to each other, the at least one first flange of the lens assembly acts as a stopper for the sub-assembly until abutting a housing flange of the housing.

16. The camera module of claim 15, wherein the at least one positioning portion is part of or attached to the lens assembly, and wherein the at least one positioning portion, in turn, comprises a positioning element projecting longitudinally along the optical axis towards the electronics carrier for attaching the lens assembly and the electronics carrier to each other with a constant predetermined gap between the lens assembly and the electronics carrier with the image sensor optically aligned with the lens assembly.

17. The camera module of claim 15, wherein the lens assembly further comprises at least one second flange projecting radially outwards from the lens assembly perpendicular to the optical axis and arranged at a distance away from the at least one first flange.

18. The camera module of claim 15, wherein the housing includes a front housing and a back housing for being coupled with each other, the front housing being configured for at least partially receiving a portion of the lens body and including the inner surface for attaching the at least one first flange.

19. The camera module of claim 15 further comprising a heater element to resistively heat the lens body, the heater element including a sheet material with electrical resistance arranged at least partially surrounding the lens body wrapping an outer side surface thereof for removing any water-based obstructions that may be attached to the lens body as an electrical current flows there through.

20. The camera module of claim 1, wherein the lens body extends outwardly away from the housing.

* * * * *